US012119581B2

(12) United States Patent
Meyrose

(10) Patent No.: US 12,119,581 B2
(45) Date of Patent: Oct. 15, 2024

(54) SOCKET CONTACT FOR PLUG CONNECTORS

(71) Applicant: HARTING Electric Stiftung & Co. KG, Espelkamp (DE)

(72) Inventor: Timm Meyrose, Espelkamp (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 306 days.

(21) Appl. No.: 17/777,379

(22) PCT Filed: Dec. 10, 2020

(86) PCT No.: PCT/DE2020/101045

§ 371 (c)(1),
(2) Date: May 17, 2022

(87) PCT Pub. No.: WO2021/121473

PCT Pub. Date: Jun. 24, 2021

(65) Prior Publication Data

US 2022/0407257 A1 Dec. 22, 2022

(30) Foreign Application Priority Data

Dec. 16, 2019 (DE) ..................... 10 2019 134 564.2

(51) Int. Cl.
*H01R 13/11* (2006.01)
*H01R 4/18* (2006.01)

(52) U.S. Cl.
CPC .............. *H01R 13/11* (2013.01); *H01R 4/183* (2013.01)

(58) Field of Classification Search
CPC ........ H01R 13/11; H01R 13/111; H01R 4/183
See application file for complete search history.

(56) References Cited

U.S. PATENT DOCUMENTS 2,280,027 A 4/1942 Busse et al.
3,129,050 A 4/1964 Dupre et al.
3,406,376 A 10/1968 Varrin
5,135,417 A 8/1992 Stanevich
6,790,101 B1 * 9/2004 Data ...................... H01R 13/53 439/181
9,917,390 B1 * 3/2018 Bianca .................. H01R 13/111
10,777,926 B2 * 9/2020 Cruble .................. H01R 13/111
2003/0104732 A1 * 6/2003 Ferderer .............. H01R 4/5025 439/863

(Continued)

FOREIGN PATENT DOCUMENTS

CN 107394445 A * 11/2017 .............. B60L 53/16
DE 1198891 B 8/1965

(Continued)

*Primary Examiner* — Marcus E Harcum
(74) *Attorney, Agent, or Firm* — Smartpat PLC

(57) ABSTRACT

A socket contact (1) has a hollow cylindrical contact wire region (AB) for receiving a stripped end portion of an electrical conductor to be connected, and a hollow cylindrical contact region (KB) with a pin insertion opening (2) for receiving a contact pin. The contact region (KB) has a cylinder wall with at least one radially inwardly folded contact blade (4), the free end of which points towards the pin insertion opening (2). The cylinder wall has an at least partially circumferential groove (5) for the contact blade in the region of the fold.

13 Claims, 1 Drawing Sheet

(56) References Cited

U.S. PATENT DOCUMENTS

| | | | | |
|---|---|---|---|---|
| 2004/0224575 | A1* | 11/2004 | Baker | H01R 13/11 439/884 |
| 2016/0020528 | A1* | 1/2016 | Miyakawa | H01R 43/16 29/874 |
| 2016/0218442 | A1* | 7/2016 | Kawamura | H01R 4/183 |
| 2018/0115115 | A1* | 4/2018 | Nakashima | H01R 4/184 |
| 2018/0205167 | A1* | 7/2018 | Bianca | H01R 13/187 |
| 2018/0351310 | A1* | 12/2018 | Gretz | H01R 13/743 |
| 2021/0151922 | A1 | 5/2021 | Bolliger | |

FOREIGN PATENT DOCUMENTS

| | | | |
|---|---|---|---|
| DE | 1640554 | A1 | 3/1971 |
| DE | 2024031 | A1 | 12/1971 |
| DE | 20008846 | U1 | 8/2000 |
| JP | 2003217557 | A | 7/2003 |
| TW | M336644 | U | 7/2008 |
| WO | 2019206784 | A1 | 10/2019 |

* cited by examiner

SOCKET CONTACT FOR PLUG CONNECTORS

TECHNICAL FIELD

The disclosure relates to a socket contact. Socket contacts are used in plug connectors for transmitting electric currents, signals and/or data.

BACKGROUND

DE 1 640 554 A1 shows a socket contact which with the aid of stamping and bending technology is produced from a flat spring steel sheet. The contact region of the socket contact has a contact blade which is folded radially inward multiple times.

The spring steel sheet used can be processed in a simple manner. However, the current-carrying capability of a socket contact produced therefrom is not always adequate.

Contact sockets which are produced from a solid material offer better electrical properties in this regard. When such a socket contact is produced from a solid material, for example from a piece of wire with a corresponding diameter, it can arise that the contact blade as a result of the bending process becomes brittle at the root. Moreover, socket contacts of this type have variations in terms of the so-called extraction forces at which the contact pin is extracted from the contact socket. As a consequence, the extraction force is always set to the upper tolerance limit, this overall leading to high extraction forces.

In the context of the priority application pertaining to the present application the German Patent and Trademark Office has searched the following prior art: DE 200 08 846 U1, DE 20 24 031 A, DE 11 98 891 B, DE 16 40 554 A and WO 2019/206 784 A1.

SUMMARY

The disclosure proposes a socket contact which is simple to produce. Moreover, the socket contact provides a reliable electric contact with a matching pin contact.

The socket contact has a hollow-cylindrical connector region. The connector region is provided for receiving a stripped end region of an electric conductor to be connected. The stripped end portion is introduced into the hollow-cylindrical connector region. The connector region is subsequently column pressed using so-called crimping pliers, as a result of which a reliably electrically conducting connection between the conductor and the socket contact is created. This is also referred to as a crimp connector.

In order to guarantee a reliable crimp connector, it has proven advantageous for the connector region to have a wall thickness of 0.5 mm to 1 mm.

The socket contact has a hollow-cylindrical contact region. The contact region has a pin introduction opening for receiving a contact pin. For electrical contacting, the contact pin is introduced axially into the contact region.

The contact region has a cylinder wall. At least one contact blade which is folded radially inward is machined from the cylinder wall in a preferably subtractive operating step. The free end of the contact blade here points toward, or in the direction of, the pin introduction opening.

The fixed end of the contact blade has a so-called root on the cylinder wall of the contact region. The contact blade is folded radially inward at the root. An at least partially encircling groove is incorporated in the region of this fold, or of the root, respectively, in the cylinder wall. It has been demonstrated that this groove can prevent in particular brittleness at the root region of the contact blade. As a result of this groove being incorporated, the contact blade kinks in a significantly more uniform manner. This leads to the extraction forces, thus when a contact pin is extracted from the contact socket, are significantly more uniform in the case of a multiplicity of contact sockets of the same type. The product quality is increased as a result.

As a result of the groove, a fixed position is predefined for the contact tongue to deform. As a result, the end portion of the contact blade in geometric terms points more uniformly into space, thus into the cylindrical contact region of the contact socket.

When a matching pin contact is pushed into the socket contact, the contact blade is pushed against the shell face of the pin contact. As a result, the pin contact is brought into physical contact in particular with the internal wall of the contact region. Overall, reliable electrical contacting between the socket contact and the pin contact is achieved as a result.

The socket contact preferably has exactly one contact blade which is folded radially inward and by way of the free end thereof points toward the pin introduction opening. The socket contact can be produced more cost-efficiently as a result.

The groove advantageously has a triangular cross section. The angle in the region of the depth of the groove is preferably between 45° and 120°. The groove preferably has a depth of 0.01 mm to 0.35 mm, however particularly preferably of 0.1 mm to 0.3 mm. A geometry of this type has proven particularly suitable for avoiding breakages as mentioned above in tests.

Alternatively, a trapezoidal or sinusoidal cross section of the groove can be chosen.

It is particularly advantageous for the cylinder wall in the region of the fold for the contact blade to have a completely encircling groove. A complete groove is not absolutely necessary in order to avoid breakages. However, such a groove has advantages in terms of production technology.

The contact region has a specific insertion depth for a matching contact pin. In a particularly advantageous design embodiment, the length of the contact blade is between 40% and 95% of the insertion depth of the contact region. The stiffness of the contact blade is established by the length of the contact blade. The force by way of which the contact blade presses on the pin contact is established by the so-called angle of attack of the blade. The plug-in forces and extraction forces are also influenced as a result.

BRIEF DESCRIPTION OF THE DRAWINGS

An exemplary embodiment of the invention is illustrated in the drawings and will be explained in more detail hereunder. In the drawings.

DETAILED DESCRIPTION

The figures to some extent contain simplified schematic illustrations. To some extent, identical reference signs are used for the same but potentially not identical elements. Different views of identical elements may be to different scales.

The socket contact 1 is produced, in particular by subtractive operating steps, from a solid piece of wire.

Figure 1:
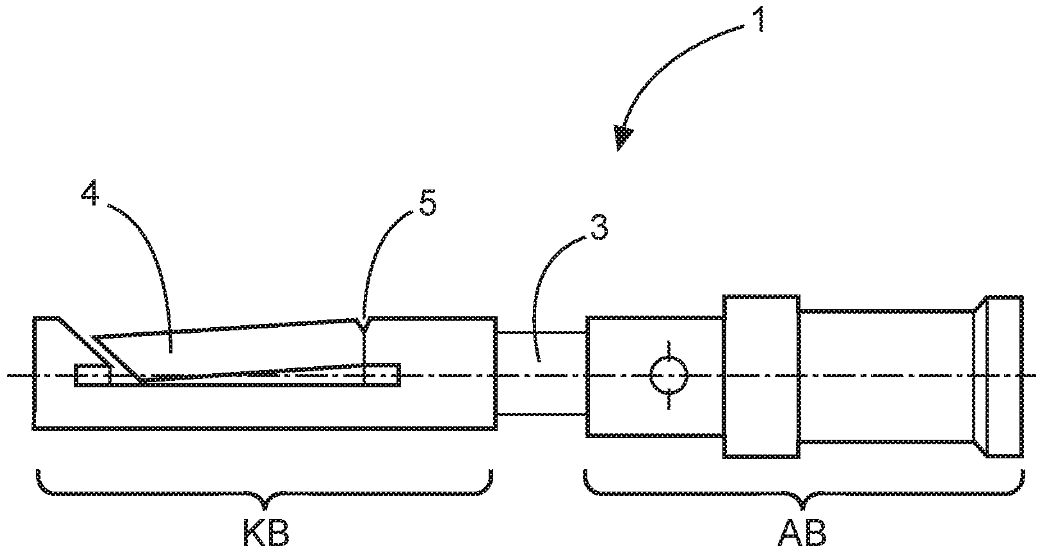
FIG. 1 shows a lateral view of a socket contact.
Figure 2:
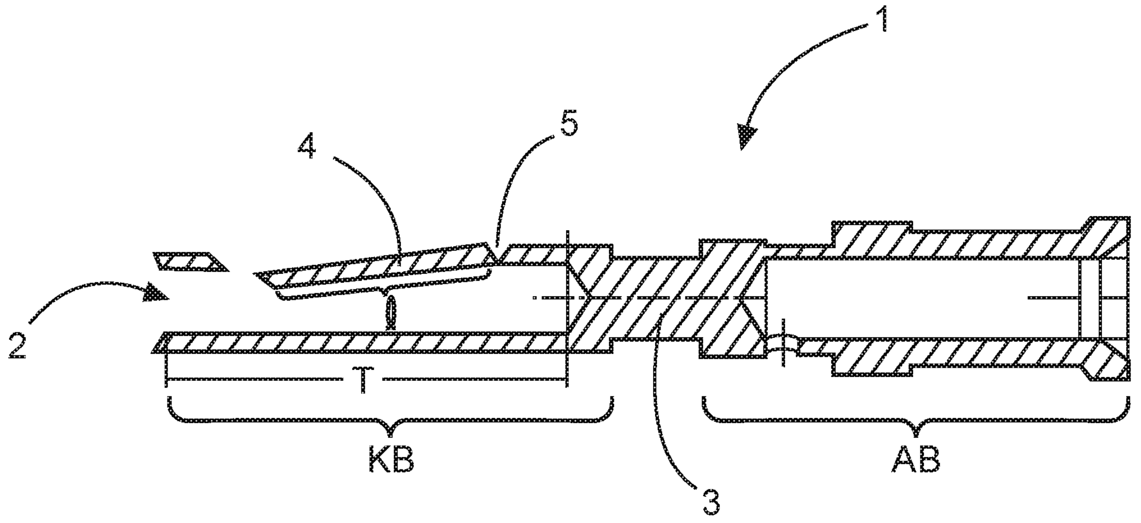
FIG. 2 shows a sectional illustration of the socket contact.

FIG. 1 shows a socket contact 1. The socket contact 1 proximal to the connector has a hollow-cylindrical connector region AB for receiving a stripped end region of an electric conductor to be connected (not shown). The connector region AB is configured as a crimp connector.

Proximal to the plug the socket contact 1 has a hollow-cylindrical contact region KB having a pin introduction opening 2 for receiving a matching contact pin (not shown for illustrative reasons). The connector region AB and the contact region KB are connected to one another by way of a solid web 3.

The contact region KB has a cylinder wall having a contact blade 4 which is folded radially inward. The contact blade 4 by way of the free end thereof points toward the pin introduction opening 2. The cylinder wall of the contact region KB in the root region, i.e. where the contact blade is bent radially inward, has an encircling groove 5.

The center of this groove can also lie so as to be eccentric in relation to the center of the hollow cylinder of the socket contact. As a result, a groove which is not visible in an encircling manner can also be created.

The contact region KB has an insertion depth T for the contact pin. The contact blade 4 has a length l. The length l is between 40% and 95% of the insertion depth T. This means that the ratio of l/T is between 0.4 and 0.95.

A slot which is inclined by approximately 45° in relation to the plug-in direction is incorporated in the cylinder wall of the contact region KB. As a result, the free end of the contact blade 4 is of an oblique design.

Even though various aspects or features of the invention are respectively shown in combination in the figures, it is clear to a person skilled in the art that—unless otherwise stated—the combinations shown and discussed are not the only ones possible. In particular, mutually corresponding units or complexes of features from different exemplary embodiments can be exchanged with one another.

LIST OF REFERENCE SIGNS

1 Socket contact
2 Pin introduction opening
3 Web
4 Contact blade
5 Groove
AB Connector region
KB Contact region
l Length
T Depth

The invention claimed is:

1. A socket contact (1), comprising:

a hollow-cylindrical connector region (AB) for receiving a stripped end region of an electric conductor to be connected; and a hollow-cylindrical contact region (KB) having a pin introduction opening (2) for receiving a contact pin, wherein the hollow-cylindrical contact region (KB) has a cylinder wall having at least one contact blade (4) which is folded radially inward along a fold, wherein a free end of the at least one contact blade (4) points toward the pin introduction opening (2), wherein the cylinder wall in a region of the fold for the at least one contact blade has a groove (5) which at least partially encircles the cylinder wall, and wherein a fixed end of the at least one contact blade (5) is connected to the groove (5) in the region of the fold of the cylinder wall.

2. The socket contact (1) as claimed in claim 1, wherein the at least one contact blade (4) is exactly one contact blade (4).

3. The socket contact (1) as claimed in claim 2, wherein the hollow-cylindrical contact region (KB) has an insertion depth (T) for the contact pin, and wherein the contact blade (4) has a length (1) which is between 40% and 95% of the insertion depth (T).

4. The socket contact (1) as claimed in claim 1, wherein the groove (5) has a triangular, trapezoidal or sinusoidal cross section.

5. The socket contact (1) as claimed in claim 1, wherein the groove (5) has a depth of 0.1 mm to 0.3 mm.

6. The socket contact (1) as claimed in claim 1, wherein the pin introduction opening (2) has a diameter of 1.5 mm to 2.5 mm.

7. The socket contact (1) as claimed in claim 1, wherein the cylinder wall in the region of the fold for the contact blade (4) has a completely encircling groove (5).

8. The socket contact (1) as claimed in claim 1, wherein the hollow-cylindrical connector region (AB) is configured as a crimp connector.

9. The socket contact (1) as claimed in claim 1, wherein the hollow-cylindrical connector region (AB) has a wall thickness of 0.5 mm to 1 mm.

10. The socket contact (1) as claimed in claim 1, wherein the socket contact (1) is machined from a solid material.

11. The socket contact (1) as claimed in claim 1, wherein the free end of the at least one contact blade (4) is of an oblique design.

12. The socket contact (1) as claimed in claim 1, wherein a center of the groove (5) lies eccentrically in relation to the center of the hollow cylinder of the socket contact (1).

13. The socket contact (1) as claimed in claim 1, wherein the groove (5) prevents brittleness of the fixed end of the contact blade (4).

* * * * *